US012423400B2

(12) United States Patent
Singh et al.

(10) Patent No.: US 12,423,400 B2
(45) Date of Patent: Sep. 23, 2025

(54) SPATIAL COMPUTING DEVICE POWERED LIDAR TECHNOLOGY ENABLED DYNAMIC QUICK RESPONSE ("QR") CODE GENERATION MECHANISM

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 121 days.

(21) Appl. No.: 18/589,525

(22) Filed: Feb. 28, 2024

(65) Prior Publication Data

US 2025/0272379 A1    Aug. 28, 2025

(51) Int. Cl.
*G06F 21/34* (2013.01)
*G06K 7/14* (2006.01)
*G06V 20/00* (2022.01)
*G06V 20/40* (2022.01)

(52) U.S. Cl.
CPC .......... *G06F 21/34* (2013.01); *G06K 7/1417* (2013.01); *G06V 20/49* (2022.01); *G06V 20/95* (2022.01)

(58) Field of Classification Search
CPC ...... G06F 21/34; G06K 7/1417; G06V 20/49; G06V 20/95
See application file for complete search history.

(56) References Cited

U.S. PATENT DOCUMENTS

| 2015/0131005 A1* | 5/2015 | Han | H04N 19/463 348/723 |
| 2018/0131976 A1* | 5/2018 | Zabelin | H04N 21/812 |
| 2025/0036739 A1* | 1/2025 | Nyamwange | G06F 21/6245 |

\* cited by examiner

*Primary Examiner* — Brian Whipple
(74) *Attorney, Agent, or Firm* — Weiss & Arons LLP

(57) ABSTRACT

A method for providing a QR code. The method includes generating a map of an environment surrounding a spatial computing device. The map may be converted into a video. The video may be stored in a database. The video may be divided into multiple frames. A pattern may be arranged for placement of the frames. The frames may be placed inside the QR code in accordance with the pattern. The QR code may be scanned. The pattern may be decoded. The video frames may be retrieved, and the video may be restored. A request associated with the QR code may be executed.

22 Claims, 7 Drawing Sheets

SPATIAL COMPUTING DEVICE POWERED LIDAR TECHNOLOGY ENABLED DYNAMIC QUICK RESPONSE ("QR") CODE GENERATION MECHANISM

FIELD OF TECHNOLOGY

Aspects of the disclosure relate to hardening QR code security.

BACKGROUND OF THE DISCLOSURE

Recently, there has been an increase in the quantity of payments that use one or more internet-based platforms. Payments that utilize internet-based platforms may be referred to as online payments. Certain online payments may be initiated with the capture of a quick response ("QR") code. A QR code is a type of two-dimensional matrix barcode. A QR code includes colored squares arranged on a light-colored background. A QR code can be scanned and read by an imaging device, such as a camera. A captured QR code is processed by a processor. The processor extracts data from the horizontal and vertical components of the QR code.

There are various use cases for QR codes. One use case includes ticketing. As such, a unique QR is created and issued for each authorized use of a system. Therefore, possession of a QR code can grant a user access into a system.

Conventional QR codes may be static, i.e., not changeable. Static QR codes may be generated once and reused multiple times. The static nature of conventional QR codes may result in unauthorized fabrication of imitation QR codes. People of malicious intent may imitate or otherwise copy QR codes. As such, people of malicious intent may access and receive information from the QR codes to which the people of malicious intent would otherwise not be able to access.

Unauthorized use of static QR codes includes using imitated or otherwise copied QR codes to install malware on a mobile device. Unauthorized use of static QR codes may also include accessing critical information stored on a mobile device. Unauthorized use of static QR codes may also include falsely authorizing payments to or from a mobile device. Unauthorized use of static QR codes may also include other security breaches associated with a mobile device.

Therefore, it would be desirable to create systems and methods to verify QR codes prior to use. Use of the QR code may include providing information to one or more entities and/or downloading software from a website.

It would be further desirable for such systems and methods to include dynamic QR codes.

It would be yet further desirable for such systems and methods to include using a spatial computing device, with light detection and ranging ("LiDAR") technology, to generate dynamic QR codes.

SUMMARY OF THE DISCLOSURE

Apparatus, systems and methods for a dynamic QR code system are provided.

The apparatus may include a spatial computing device. A spatial computing device may be a device that enables a user to interact with a computer in a digital environment. The spatial computing device may be compatible with augmented reality and/or virtual reality. The spatial computing device may react to hand movements, eye movements, voice commands and any other suitable stimulus.

The spatial computing device may include a LiDAR analyzer. The LiDAR analyzer may form part of the spatial computing device. In some embodiments, the LiDAR analyzer may be distinct from the spatial computing device. A user may wear a spatial computing device when scanning the dynamic QR code. As such, the spatial computing device may be associated with the user.

In certain embodiments, a spatial computing device may be associated with an environment surrounding the dynamic QR code. For purposes of this application, an environment may be understood to mean a predetermined physical area surrounding the dynamic QR code. The environment surrounding the dynamic QR code may be equipped with one or more spatial computing devices. As such, the spatial computing devices may be in any other suitable location surrounding the dynamic QR code. Examples of a location for an environment-based spatial computing device may include a top of an electric pole and a corner of a room. Each of the one or more spatial computing devices may include a LiDAR analyzer.

Each of the spatial computing devices, whether associated with the user, or associated with the environment surrounding the spatial computing device(s), may use one or more LiDAR analyzers to map the environment surrounding the spatial computing device(s).

LiDAR technology is a depth recognizing system using laser lights. A LiDAR analyzer may create a map of a physical environment surrounding the spatial computing device. The map may be generated with respect to the user. As such, the user may be located centrally within the map. The map may include one or more objects and anchors in the spatial environment. The LiDAR analyzer may convert the map into a video.

The video may include the captured map. The video may not include the captured map. The video may capture an actual transaction performed by the user. The video may capture a location in which the user was situated.

In certain embodiments, apparatus may include a spatial device integration module. The spatial device integration module may be associated with the spatial device. The spatial device integration module may be operable to transmit the captured map of the environment, and/or any other map captured by the spatial device, to the entity associated with the dynamic QR code.

The apparatus may include a database. The database may be located at, or associated with, the entity. The videos captured by the LiDAR analyzer may be stored in the database. The database may link the one or more videos to a memory location associated with the user. As such, the database may store the one or more videos in a location associated with, or assigned to, the user. The videos may be stored for future use.

The apparatus may include a video frame analyzer. The video frame analyzer may be associated with the entity. The video frame analyzer may be associated with a scanning device. The video frame analyzer may retrieve, from the database, the captured video and/or any other videos associated with the user. The retrieved video may be associated with, or linked to, the user currently scanning the dynamic QR code.

The video frame analyzer may divide the retrieved video into multiple video frames. Each frame may correspond to or include a segment of the video. The retrieved video may be restored when substantially all of the frames are combined in the correct order.

The video frame analyzer may analyze the video frames. The video frame analyzer may analyze the video frames to determine whether the video frames demonstrate one or more anomalies. The video frame analyzer may analyze the video frames by determining a legitimacy metric. A legitimacy metric may include one or more legitimacy factors. A video frame may be legitimate if it includes two or more legitimacy factors. Legitimacy factors may be physical features that verify that the video is genuine. Examples of legitimacy factors may include a floor and a wall. Video frames determined to be legitimate may be placed in the QR code.

The apparatus may include an artificial intelligence ("AI") based dynamic pattern encoder. The AI based dynamic pattern encoder may be associated with the entity. The AI based dynamic pattern encoder may be associated with the scanning device. The AI based dynamic pattern encoder may be operable to arrange a pattern for placement of the video frames within the dynamic QR code. The pattern may include a plurality of levels.

The apparatus may include a video frames formation generator (also referred to herein, as a "video frames formation mechanism"). The video frames formation generator may place the multiple video frames in a formation within the dynamic QR code. The video frames may be stored within the dynamic QR code. The video frames may be stored on the scanning device. The video frames may be stored at a storage location associated with the entity or institution. At times, memory location pointers may be included and/or encoded within the QR code. The memory location pointers may point to a location in memory in which the video frames are stored. The memory may be associated with the entity, institution and/or scanning device. As such, in certain embodiments, the video frames may include a memory location pointer that points to a location in memory that stores a video frame. The formation may be in accordance with the pattern. The video frames formation mechanism may place the multiple frames in the dynamic QR code. The pattern may have been generated by the AI-based dynamic pattern encoder.

The apparatus may include a dynamic QR code. The dynamic QR code may be generated at a computing device. The computing device may be associated with an entity or institution.

It should be noted that other machine-readable labels, such as a parallel line bar code, may be used in place of, or in combination with, the QR code. The dynamic QR code may be generated in real-time. The dynamic QR code may change with each application and/or usage. The dynamic QR code and associated video, algorithm and/or pattern may expire after one time usage (or any other suitable predetermined number of times).

The QR code may include a bottom level. The bottom level may also be referred to as a first level. The bottom level may be located on the left corner of the dynamic QR code. The bottom level of the QR code may be a square. In some embodiments, the bottom level may be located at any location within, inside or on the QR code. The bottom level may be encoded with a pattern, a portion of a pattern and/or algorithm. The pattern and/or algorithm may be used to decode other levels included in the dynamic QR code. The dynamic QR code may include other levels. The other levels may be part of the pattern. The video frames may be stored in the other levels.

The apparatus may include a scanning device. The scanning device may be a camera. The user may use a scanning device to scan the dynamic QR code. The scanning device may be included in a user's mobile device, a smart watch, a computer, a camera or any other suitable device.

The apparatus may include an entity integration module. The entity integration module may be referred to as an institution integration module. The entity integration module may operate on the scanning device. The entity integration module may include software and/or hardware. The entity integration module may be operable to transmit the first level and/or the other levels from the scanning device to the entity. The institution integration module may enable the mobile device to integrate with communication protocols, such as Wi-Fi®, Internet and Bluetooth®. The institution integration module may initiate communication with the institution, via one or more of the above-mentioned protocols, upon scanning and processing the dynamic QR code.

The apparatus may also include a combination first level encoder and decoder. The combination first level encoder and decoder may be associated with the scanning device. The combination first level encoder and decoder may be associated with the entity. The first level encoder and decoder may generate a first level code. The first level code (also referred to as a bottom level code) may be an algorithm. The first level code may be the pattern generated by the AI based dynamic pattern encoder. The algorithm may be created, in real-time, by the first level encoder and decoder. The algorithm may be used to decode remaining levels of the QR code.

The algorithm may be used to decode the remaining levels of the dynamic QR code. After decoding the first level, a second level may be decoded using the algorithm and/or pattern. Upon decoding the second level, a first video frame may be obtained. Upon obtaining the first video frame, a third level may be decoded. The third level may reveal a second video frame. The decoding of each of the levels and revealing of each of the video frames may continue until substantially all levels are decoded and each of the video frames are revealed.

The video frames formation mechanism may also use the plurality of video frames obtained from each of the levels to restore the retrieved video. In some embodiments, the restored video may be a previous transaction performed by the user. The restored video may be displayed on the user's scanning device and/or on a device located within the institution.

The apparatus may also include a final QR code verifier. The final QR verifier may verify the dynamic QR code. To verify the dynamic QR code, the restored video may be compared to a real-time video captured concurrent with the user scanning the QR code. The comparison may determine whether the user is indeed who the user is purporting to be.

The comparison may be performed by displaying the restored video and the real-time video adjacent to each other. For purposes of the application, displayed adjacent to each other may be understood to mean displaying on one or more screens side by side, displaying on one or more screens one after another and/or other suitable methods of adjacent displaying. The current video and the restored video may be displayed to a third-party and/or within an AI module such as the final QR code verifier. As such, the display to the third-party and/or within the AI module may verify the user. The third-party and/or the AI module may determine whether the two videos match over a predetermined threshold of confidence.

A threshold of confidence may be identified based on a comparison between a plurality of data points in the current video and a plurality of datapoints in the restored video. The confidence level may be assigned based on the similarities.

When the difference between the data points of the current video and the restored video is less than a percentage, the predetermined threshold of confidence may not be reached. When the two videos match over a predetermined threshold, the user may be verified. A predetermined threshold may be the both of the videos include three legitimacy factors.

Upon verification of the user, a final QR code generator may generate a user's identification associated with the dynamic QR code. The final QR code generator may be associated with the scanning device. The final QR code generator may be associated with the entity. The final QR code generator may also be adept to verify the user's identification associated with the dynamic QR code. Once the user is verified, a request associated with the dynamic QR code may be completed. The algorithm, video and pattern may change with each transaction to harden the security associated with the algorithm, video and pattern.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
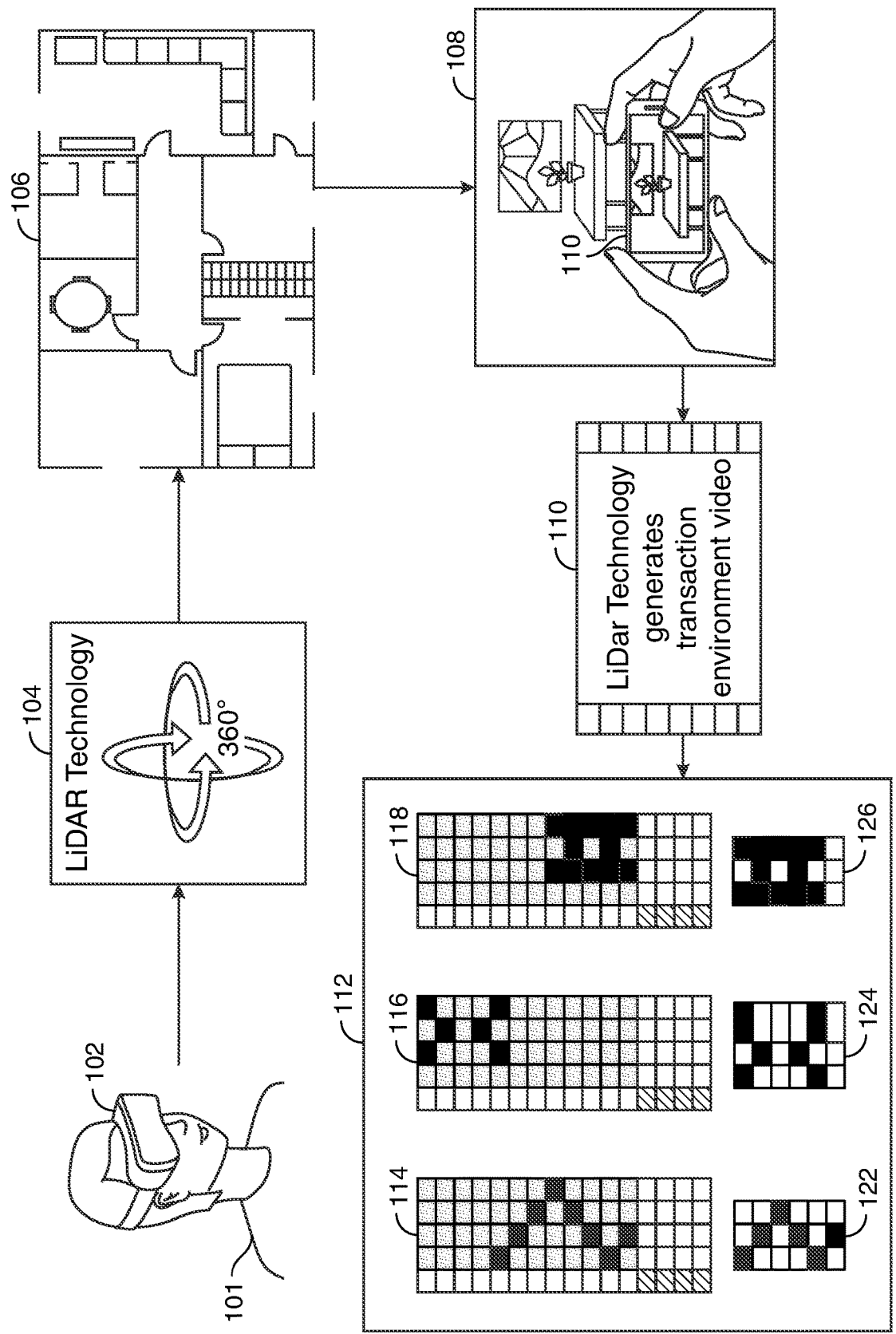
FIG. 1 shows an illustrative flow diagram in accordance with principles of the disclosure.

Apparatus, systems and methods for a dynamic QR code system are provided.

Methods may include using a spatial computing device. In some embodiments, the spatial computing device may be associated with the user. A user may wear the spatial computing device when scanning the dynamic QR code. The spatial computing device associated with the user may be a pair of spatial computing glasses or any other suitable spatial computing device. Spatial computing glasses may be a spatial computing device headset designed to be worn in a manner similar to eyeglasses. The spatial computing device may include a LiDAR analyzer. The LiDAR analyzer may form part of the spatial computing device. In some embodiments, the LiDAR analyzer may be distinct from the spatial computing device.

In other embodiments, a spatial computing device(s) may be associated with an environment surrounding the dynamic QR code. The environment surrounding the dynamic QR code may be equipped with one or more spatial computing devices. Each of the one or more spatial computing devices may include a LiDAR analyzer.

Methods may also include mapping the environment surrounding the spatial computing device. Each of the spatial computing devices, whether associated with the user or associated with the environment surrounding the dynamic QR code, may use one or more LiDAR analyzers to map the environment surrounding the spatial computing device. The environment may be mapped with respect to the user. As such, the user may be centrally located within the map. The map may be generated using the LiDAR analyzer.

The LiDAR analyzer may map the environment using a light detection technique to calculate depth. The LiDAR analyzer may emit infrared light pulses. The LiDAR analyzer may measure the time elapsed between sending out the light pulses and the return of the light pulses after hitting nearby objects. The time elapsed between the output laser pulse and the reflected pulse enables a LiDAR sensor, located within the LiDAR analyzer, to calculate, based on the speed of light, the distance to each object.

Methods may further include converting the map into a video. The video may include the captured map. The video may not include the captured map. Converting the map into a video may be executed using the LiDAR analyzer. The LiDAR analyzer may use the map, created with the emitted light pulses, to convert the map into a video. The video may include items within the surrounding environment. The video may include the user scanning the dynamic QR code. The video may include other suitable items and/or images.

Methods may include storing the captured video in a database. The video captured by the LiDAR analyzer may be stored in a database. The database may be located within, located outside of, and/or associated with, the entity. The database may store one or more videos in a location associated with, and/or assigned to, the user. Previous videos of the user may have been previously stored in the location associated with, and/or assigned to, the user. The videos may be stored for current use. The videos may be stored for future use.

Methods may also include dividing the previously stored video into multiple video frames. A video frame analyzer may divide the video into multiple video frames. Each video frame may be a segment of the video. A combination of the multiple video frames may create a complete video. The multiple video frames may be designed (size-wise or otherwise) for placement within the dynamic QR code.

Methods may include arranging a pattern for placement of the dynamic QR code. The pattern may be arranged using an AI based dynamic pattern encoder. The placement of the video frames may be in accordance with the pattern.

Methods may further include placing the multiple video frames within the dynamic QR code. Placement of the video frames may be in accordance with the pattern. The pattern may be created using an AI based dynamic pattern encoder. The pattern may include one or more levels. Each of the one or more levels may include a segment of the pattern. Each of the one or more levels may include an entire pattern. The pattern may be segmented into a plurality of levels. The plurality of levels may include a second level, a third level, a fourth level and/or any other additional levels.

Methods may include providing and/or generating a dynamic QR code. The dynamic QR code may be associated with an institution. The dynamic QR code may be associated with an entity. The dynamic QR code may include a plurality of levels. The plurality of levels may include a first level. The plurality of levels may include one or more levels in addition to the first level. The one or more levels in addition to the first level may be referred to as additional levels or other levels.

Methods may include scanning of the dynamic QR code. A scanning device may scan the dynamic QR code. A user may scan the dynamic QR code. Scanning the QR code may enable the user to connect, retrieve or access information in the associated institution and/or associated entity. Such information may include payment information. For example, a user may scan a QR code to make a payment to an institution associated with the QR code.

Methods may include transmitting a first level of the dynamic QR code to the entity. An entity integration module, residing on the scanning device, may be operable to transmit the first level. The entity integration module may include software and/or hardware. The entity integration module may enable the scanning device to communicate with the institution. The entity integration module may communicate via Wi-Fi®, Bluetooth® and/or any other suitable communication methods. The first level may be transmitted to the entity for decoding.

Methods may include decoding the first level. A first level encoder and decoder may decode the first level. The first level encoder and decoder may be associated with the entity. The first level encoder and decoder may be associated with the scanning device. Decoding the first level may reveal an algorithm and/or pattern encoded within the first level. The algorithm and/or pattern may be used to decode the remainder of the QR code. As such, the remainder of the QR code may be decoded using the algorithm.

The remaining levels may be referred to as a plurality of other levels. Each level included in the plurality of other levels may include a segment of the pattern. The pattern may be found among the plurality of other levels.

Methods may include decoding the plurality of other levels. A multi-level encoder and decoder may use the algorithm and/or pattern to decode the other levels. The multi-level decoder and encoder may be associated with the entity. The multi-level decoder and encoder may be associated with the scanning device. The multi-level encoder and decoder may decode each of the plurality of other levels in a predetermined sequence. For example, decoding a second level may reveal a first video frame. The multi-level encoder and decoder may decode each subsequent level included in the dynamic QR code. Each subsequent level may reveal a subsequent video frame. The revealing of each of the levels may continue until substantially all of the video frames are revealed.

A level may be a visible portion of the QR code. A level may be a top portion of the dynamic QR code. A level may be a middle portion of the dynamic QR code. The dynamic QR code may include a multi-level level. A multi-level level may be understood to mean a level which spans more than one level. For example, a multi-level level may be located, in part, on the second level and in part, on the third level.

Methods may also include retrieving the video frames. The video frames may be retrieved from the other levels, in accordance with the pattern.

In response to retrieving the video frames, methods may continue with restoring the previously stored video. The previously stored video may be restored using the video frames retrieved from the dynamic QR code. A complete version of the previously stored video may be restored upon revealing of substantially all the video frames.

Methods may include displaying a playback of the previously video on the scanning device and/or on a device associated with the entity. The previously stored video may be replayed to verify the authenticity of the user.

Methods may also include comparing the previously stored video to a current video of the user. A final QR verifier may compare the two videos. The final QR verifier may be associated with, and/or located within, the institution. The final QR verifier may compare the current video to the previously stored video to ensure that the user in both videos is the individual that the user purports to be.

Methods may include multiple comparisons. A fraud detection controller may execute a second comparison. A fraud detection controller may execute an additional comparison between the two videos to ensure that the user is legitimate.

Methods may include verifying the authenticity of the user. In response to the final QR verifier and/or the fraud detection controller comparing the two videos, the authenticity of the user may be verified. The fraud detection controller and final QR verifier may verify the user using one or more legitimacy factors. Legitimacy factors may be physical features that verify that the video is genuine. Examples of legitimacy factors include a floor and a wall.

Upon authenticating the user's identification in the QR code, methods may include granting the user the access and ability to use the dynamic QR code to complete the request associated with the dynamic QR code.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow diagram in accordance with the principles of the disclosure. User 101 may wear spatial computing glasses 102. User 101 may scan a dynamic QR code using one or more computing devices. User 101 may scan the dynamic QR code with spatial computing glasses 102. Spatial computing glasses 102, or any other spatial computing device, may include LiDAR technology 104. LiDAR technology 104 may include a LiDAR analyzer. LiDAR technology 104 may create a map of an environment surrounding the user and spatial computing device 102. The mapping may be a complete mapping (360 degrees) of the environment with respect to the user. The mapping may be a partial mapping (less than 360 degrees) of the environment with respect to the user.

The map, as shown at 106, may be a map of the room in which the user was located. The map may capture the user. The map may capture other people and/or other objects in the environment.

In some embodiments, LiDAR technology 104 may map an environment surrounding the user. The environment surrounding the user may be, for example, a user's living room.

At times, LiDAR technology 104 may have previously mapped the living room when used with a previous transaction. As such, the dynamic QR code system may bypass the verification process upon recognition of the environment via LiDAR technology 104. Bypassing the verification process may include authenticating the user and allowing the user to use the dynamic QR code without the verification process.

LiDAR technology 104 may convert the map into a video as shown at steps 108 and 110. The video may be used to verify the user in a current transaction. The video may be stored in a database. The video may be stored within the database, in a location associated with, and/or assigned to, the user. The stored video may be used to verify the user in a different transaction, such as, a future transaction. It should be noted that a video captured currently may be referred to as a current video, while a video previously captured and previously stored may be referred to as a previously stored video. The previously stored video may be a previously stored video of the user performing a transaction. The previously stored video may be a video of the user in a different location. The previously stored video may be any previously stored video associated with the user.

The previously stored video may form a part of the dynamic QR code. The previously stored video may be divided into multiple video frames. Each video frame may be a segment of the video. The multiple video frames, when combined, may generate a restored version of the previously stored video. Each of the multiple video frames may be stored in the QR code. The video frames may be stored in a pattern formation, such as pattern 112. The pattern may be inside the dynamic QR code.

The pattern may include multiple levels. The video frames may be segmented among the various levels. The bottom level, or first level, is not shown in FIG. 1. The bottom level may include a pattern that decodes the remaining levels of the QR code. The pattern may be a pattern in which the video frames are placed.

The pattern may include levels. For example, a second level, represented by 114, may include a first segment of the pattern. The first segment of the pattern is represented by pattern segment 122. Pattern segments may be a group of boxes in which the video frames are placed. The previously stored video may be restored when the video frames are retrieved from the dynamic QR code in the order indicated by the pattern. If the video frames are retrieved in an order different from the QR code, the video may not be restored.

A third level may be a next level of the pattern. The third level may be represented by 116. The second segment of the pattern may be represented by pattern segment 124. Pattern segment 124 may include a segment of the video frames. The segment of the video frames may be a second segment of the video frames. The second segment of the video frames may include portions of the video that follow the first segment of the pattern.

A fourth level may follow the third level. The pattern segment of the fourth level is represented by pattern segment 126. Pattern segment 126 may include a segment of the video frames. It should be noted that each of the levels are included in the dynamic QR code. The pattern and levels may be located in different areas of the dynamic QR code.

In some embodiments, there may be less pattern levels. In some embodiments there may be more pattern levels. Different applications may include varying numbers of levels and varying patterns. The dynamic QR code pattern may be modified with each application. The number of levels may change with each application.

Figure 2:
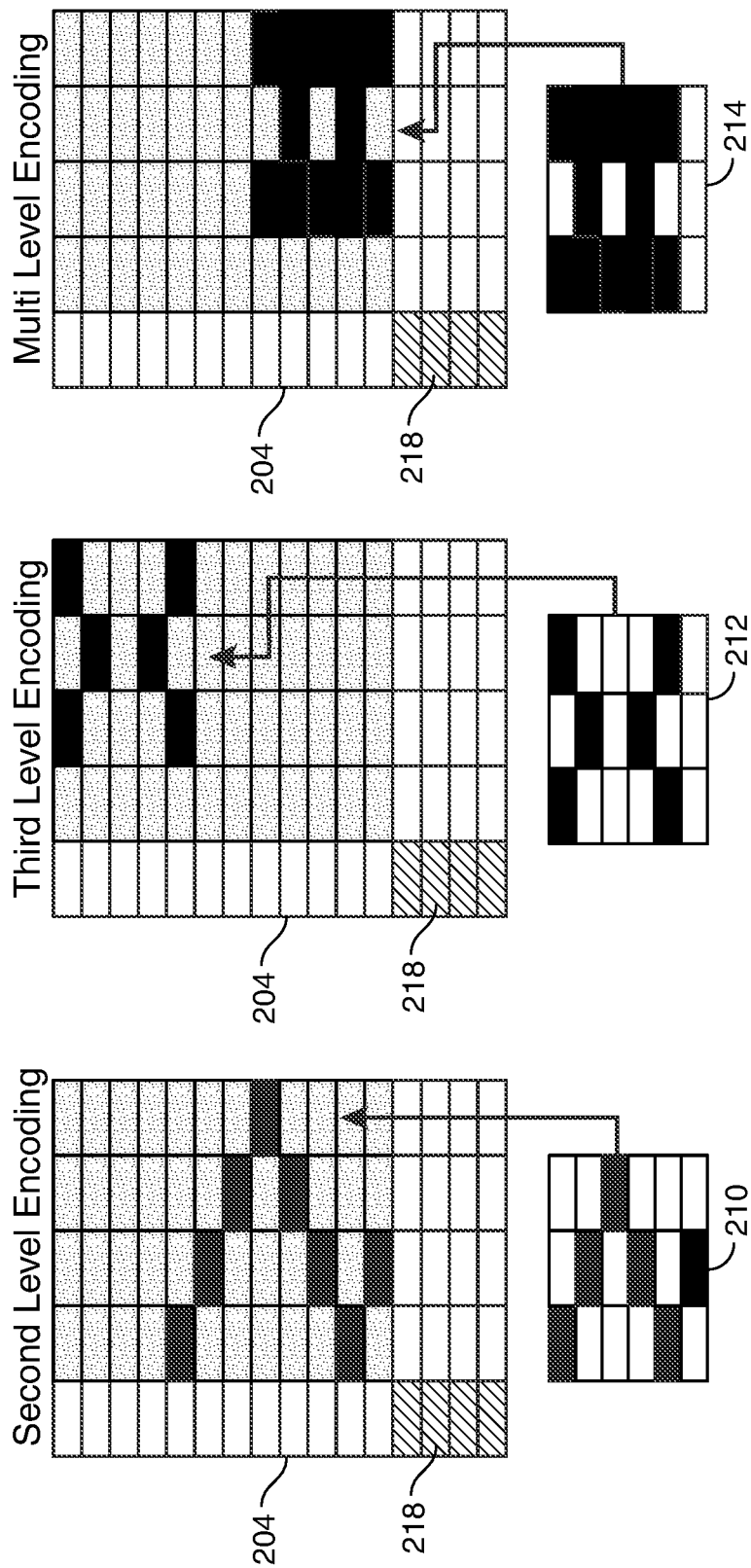
FIG. 2 shows an illustrative diagram in accordance with principles of the disclosure.

FIG. 2 shows an illustrative diagram in accordance with the principles of this disclosure. FIG. 2 shows a pattern which relates to the pattern shown at 112 in FIG. 1. The pattern, shown in FIG. 2, may be used to encode the dynamic QR code. The dynamic QR code may be dynamic QR code 204.

The QR code may include a bottom level. The bottom level may be bottom level 218. Bottom level 218 may be a first level of the dynamic QR code. Bottom level 218 may have been previously encoded. Decoding the bottom layer may reveal an algorithm and/or pattern. The decoded algorithm and/or pattern may have been used to encode the other portions of the QR code. As such, the decoded algorithm may enable the decoding of the remainder of the dynamic QR code. In some embodiments, bottom level 218 may not be included in the pattern.

An entity institution module, residing on a scanning device that scans the QR code, may transmit the bottom level to a first level encoder and decoder. Bottom level 218 may be decoded by the first level encoder and decoder.

A multi-level encoder and decoder may use the algorithm decoded from the bottom level to decode the other levels within the dynamic QR code. For example, following decoding the bottom level, a second level 210 may be decoded. Using the algorithm to decode, second level 210 may reveal video frames that may be used to restore the video.

The second level of the pattern may be represented by 210. Second level 210 may reveal the first level encoding. It should be noted that the pattern shown at second level 210 may correspond to second level 114 in FIG. 1.

Upon retrieval of the first part of the pattern, a second part of the pattern may be retrieved. The second part of the pattern may be stored in the third level encoding. The third level encoding may be represented by third level 212. The multi-level encoder and decoder may decode the third level encoding using the algorithm retrieved from bottom level 218. Third level 212 may be decoded to reveal the video frames to form the final video.

At times, levels may be multi-encoded. A multi-encoded level may be represented by level 214. A multi-encoded level may be a level that is formed over one or more levels. The multi-encoded level may be part on level one, and part on level two. The multi-encoded level may be a sequential level of the pattern.

Figure 3:
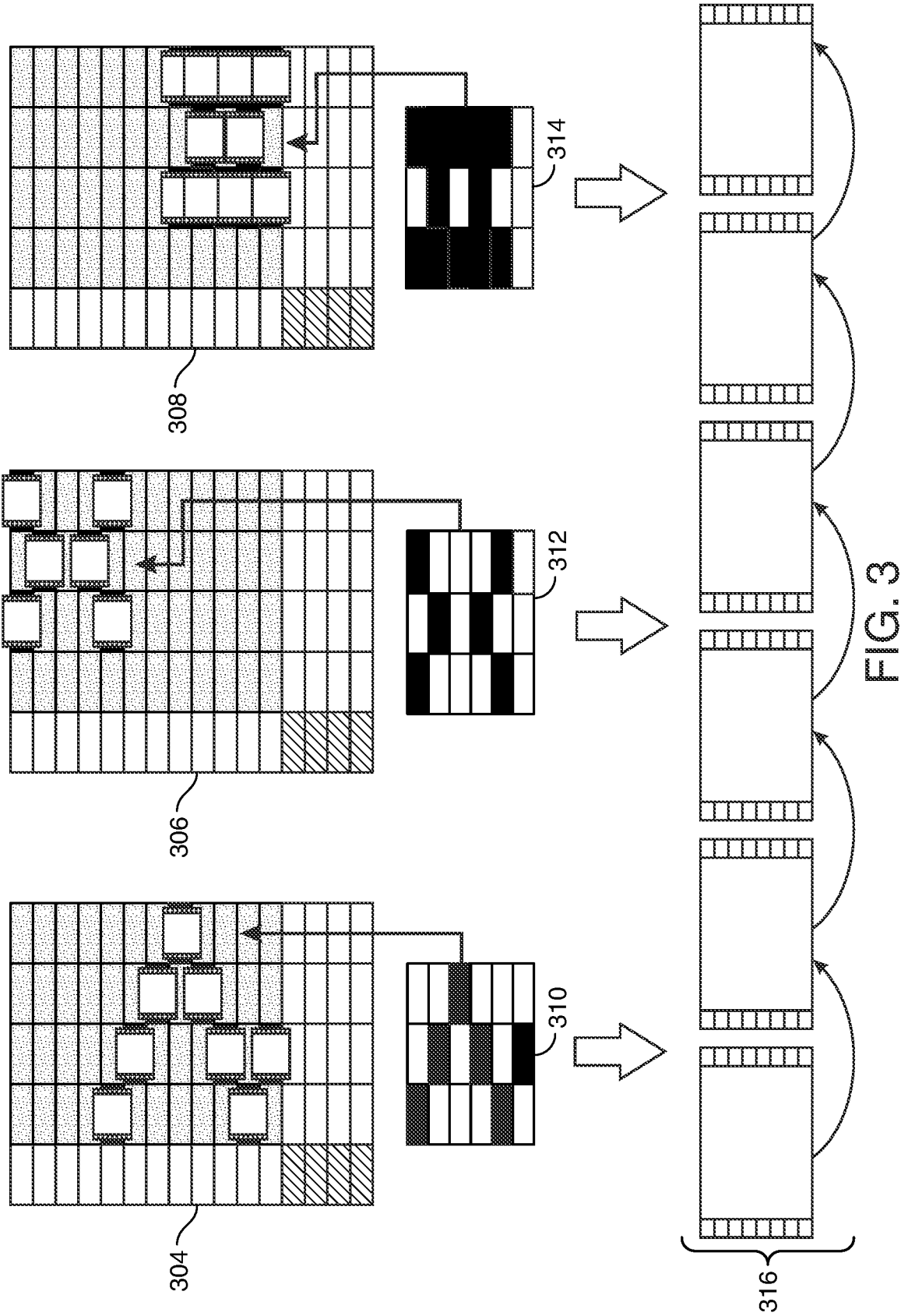
FIG. 3 shows another illustrative diagram in accordance with the principles of the disclosure.

FIG. 3 shows the patterns with a thumbnail image of the video frames in each part of the pattern. Dynamic QR codes 304, 306 and 308 may be similar, or equivalent, to the dynamic QR code 204, shown in FIG. 2. Second level of dynamic QR code 304 and first segment 310 may show the second level encoding. The second level encoding may be represented by second level 210 in FIG. 2. Second level of dynamic QR code 304 may show the video frames stored inside the second level.

Third level of dynamic QR code 306 and second segment 312 may be the third level encoded, as shown in 212 of FIG. 2. Third level of dynamic QR code 306 and second segment 312 may be the third level of the pattern. Third level 306 and 312 may have the next frames of the video. In response to decoding the third level, the following video frames may be revealed.

Fourth level 308 and third segment 314 may be the multi-level encoding. A multi-level may be in a location within two levels of the dynamic QR code. The multi-level encoding may have sequential video frames. The multi-level encoding may have final frames of the video. The video may be restored after decoding the last of the sequential video frames.

Step 316 shows restoring of the video. As each level is decoded, the frames from each level may be revealed. The frames may be retrieved in the order of the pattern. The video may be restored upon the retrieval of the frames. The video frames may be formed together to restore the video.

Figure 4:
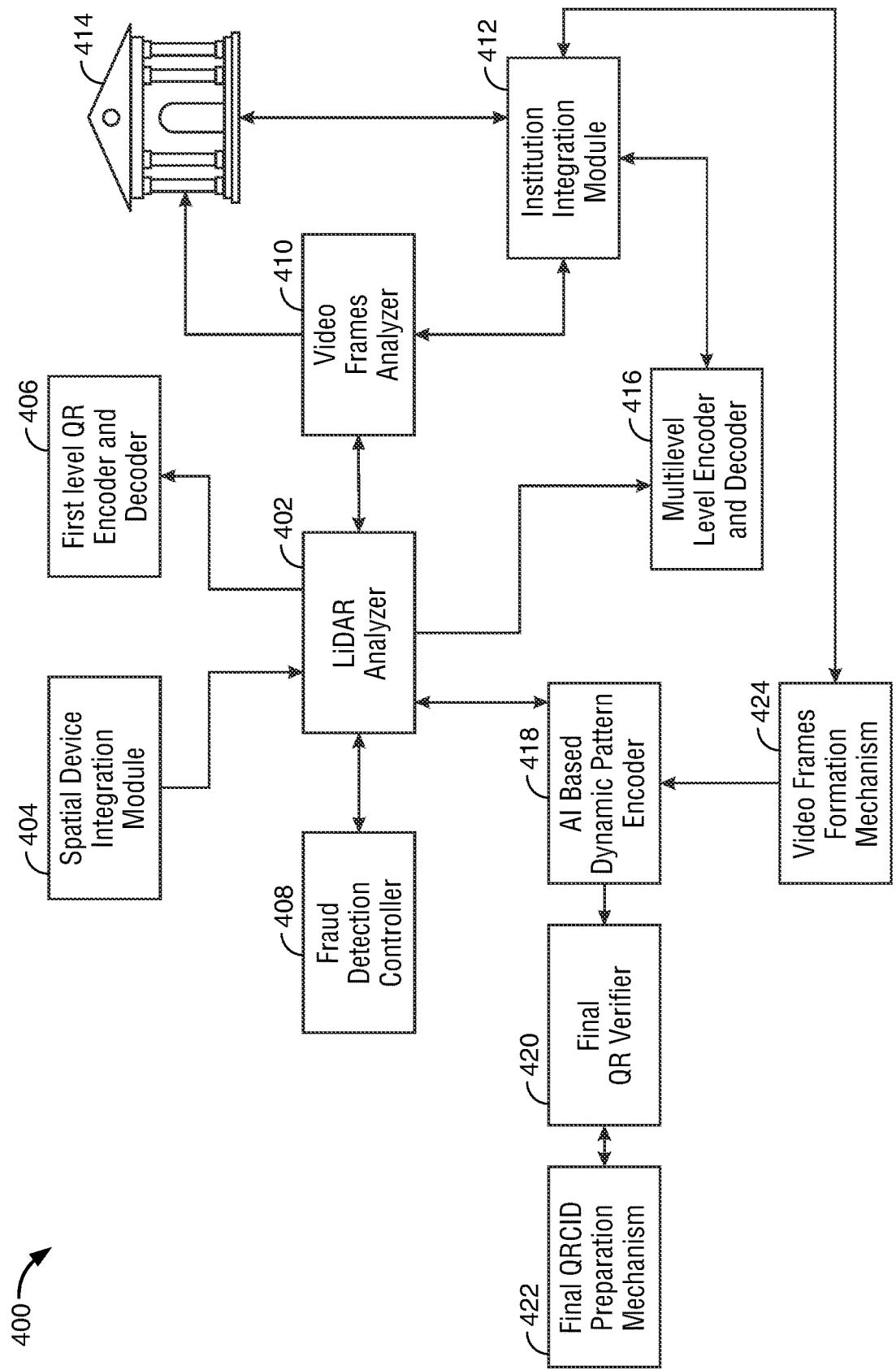
FIG. 4 shows another illustrative flow diagram in accordance with the principles of the disclosure.

FIG. 4 shows an illustrative flow diagram. The flow diagram may include apparatuses used in the spatial computing device powered by LiDAR technology enabled dynamic quick response ("QR") code generation mechanism. An entity 414 may be an entity that generates the dynamic QR code. The dynamic QR code may be connected to institution integration module 412. Institution integration module 412 may enable communication between the institution and a scanning device. Institution integration module 412 may be a software application found within the scanning device. As the user scans the dynamic QR code, institution integration module 412 may transmit the scanned image (the dynamic QR code) to institution 414.

A user may wear a spatial computing device. The spatial computing device may communicate with a spatial device integration module 404. Spatial device integration module 404 may be a software and/or a hardware. Spatial device integration module 404 may enable communication between the spatial computing device and LiDAR analyzer 402. In some embodiments, LiDAR analyzer 402 may form a part of the spatial computing device. In certain embodiments, LiDAR analyzer 402 may be external to the spatial computing device. LiDAR analyzer 402 may generate a map of an environment around the user and the spatial computing device. Spatial device integration module 404 may transmit the generated map to the entity. Spatial device integration module 404 may transmit the generated map from LiDAR analyzer 402 to the spatial computing device.

LiDAR analyzer 402 may transmit the generation of the video to a first level encoder and decoder 406. First level encoder and decoder 406 may generate a code for the first level. The code may be an algorithm. The code may be a pattern. The code may be used to encode and decode the other levels of the dynamic QR code. First level encoder and decoder 406 may transmit to LiDAR analyzer 402 that the first level code has been generated.

LiDAR analyzer 402 may transmit the captured video to a video frames analyzer 410. Video frames analyzer 410 may divide the captured video into video frames. In certain embodiments, video frames analyzer 410 may divide a previously stored video, stored in a database associated with the user, into multiple video frames. Video frames analyzer 410 may transmit the captured video to the institution integration module 412.

LiDAR analyzer 402 may communicate with multi-level encoder and decoder 416. Multi-level encoder and decoder 416 may encode the other levels. Multi-level encoder and decoder 416 may also decode the other levels of the dynamic QR code.

LiDAR analyzer 402 may communicate with a fraud detection controller 408. Fraud detection controller 408 may be initiated by a message received from LiDAR analyzer 402. Fraud detection controller 408 may verify that the dynamic QR code, the video frames and the user are authentic.

LiDAR analyzer 402 may communicate with an AI based dynamic pattern encoder 418. AI based dynamic pattern encoder 418 may generate a pattern for the dynamic QR code. The pattern may be stored in one or more levels (however, not the bottom level). The pattern may be a pattern for placement of the divided video frames.

The pattern may be a pattern for storage of the multiple video frames. There may be a video frames formation mechanism 424. Video frames formation mechanism 424 may communicate with institution integration module 412. Institution integration module 412 may communicate with video frames formation mechanism 424 upon the creation of the multiple video frames. Video frames formation mechanism 424 may communicate with AI based dynamic pattern encoder 418 upon the creation of the video frames. Video frames formation mechanism 424 may receive instruction from AI based dynamic pattern encoder 418 in order to place the multiple video frames in the dynamic QR code in accordance with the pattern.

AI based dynamic pattern encoder 418 may communicate with a final QR verifier 420. Final QR verifier 420 may verify the dynamic QR code by comparing the video used inside the dynamic QR code with the current video. Upon comparing the previously stored video to the current video, the user in the video may be verified. The verification may be confirmed when the user in the previously stored video matches the user in the current video over a threshold level of confidence. Upon verification, final QR verifier 420 may communicate with a final quick response code identifier ("QRCID") preparation mechanism 422 to generate an authentic user identifier for the user.

In response to receiving an authentic user identifier, the user may be able to execute a request associated with the dynamic QR code. The request may include a plurality of requests.

Figure 5:
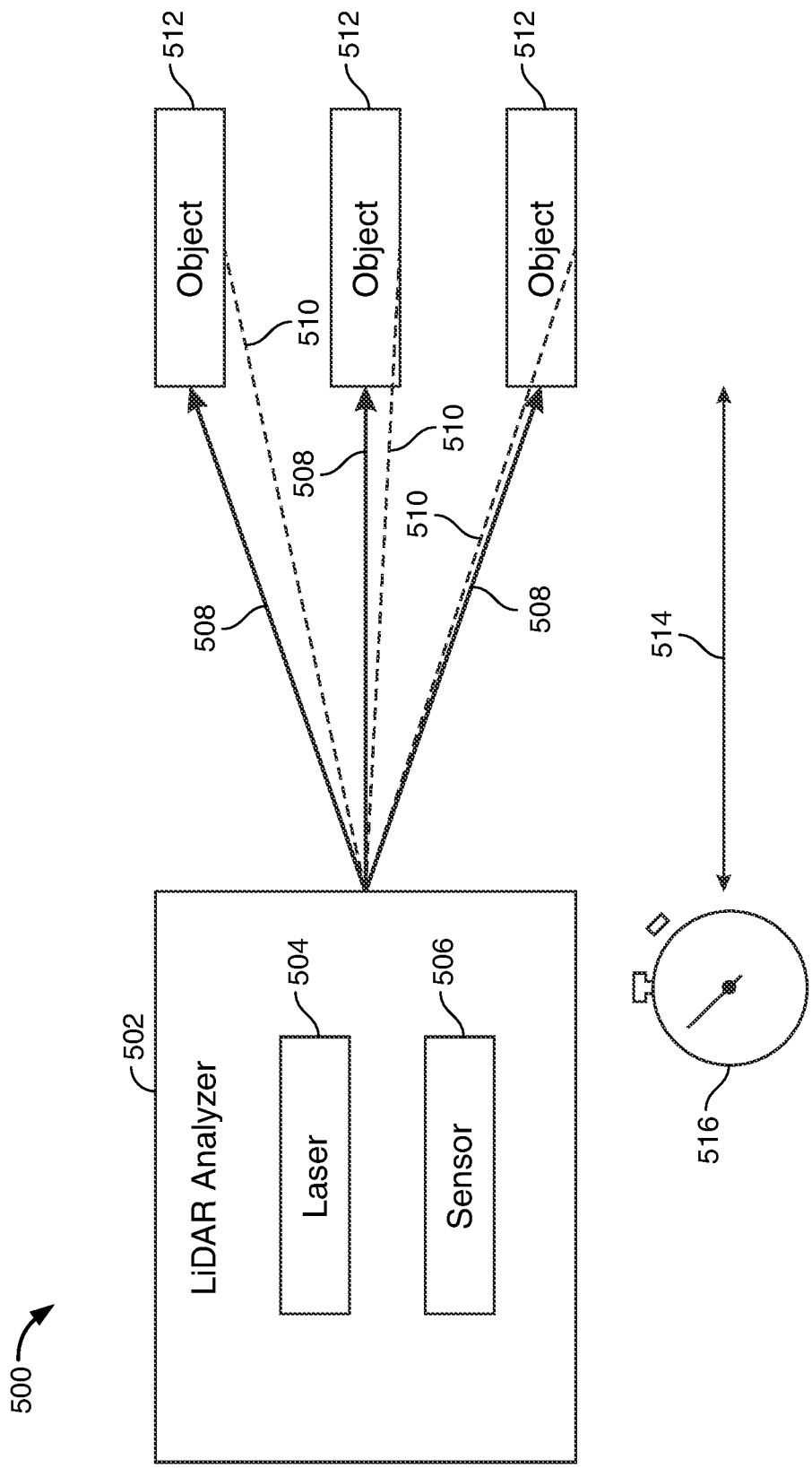
FIG. 5 shows still another illustrative flow diagram in accordance with the principles of the disclosure.

FIG. 5 shows a diagram. Diagram 500 shows a light detection and ranging ("LiDAR") analyzer using LiDAR technology. LiDAR is a sensing technology that is similar to radar but uses light waves in place of radio waves. The LiDAR technology applies the principles of reflected light and accurate timing to measure the distance of an object. LiDAR technology permits superior depth sensing due to a plurality of levels of depth and an angular resolution included in the LiDAR technology. In addition, LiDAR technology can operate in all light conditions because LiDAR operates with an active approach that uses an infrared light transmitter together with a receiver.

LiDAR analyzer 502 includes a laser 504 and a sensor 506. Laser 504 may send a laser beam, shown at laser beam 508. Laser beam 508 may hit one or more objects. The objects may be objects 512. Upon hitting objects 512, laser beam 508 may then return to the LiDAR analyzer, as shown at 510. The distance between LiDAR analyzer 502 and objects 512, as shown at 514, may be timed, as represented at 516. The time lapsed from when the laser beam hits the objects and returns to the LiDAR analyzer may be measured and sensed by sensor 506. The time lapsed may be used to determine the distance of objects 512.

Figure 6:
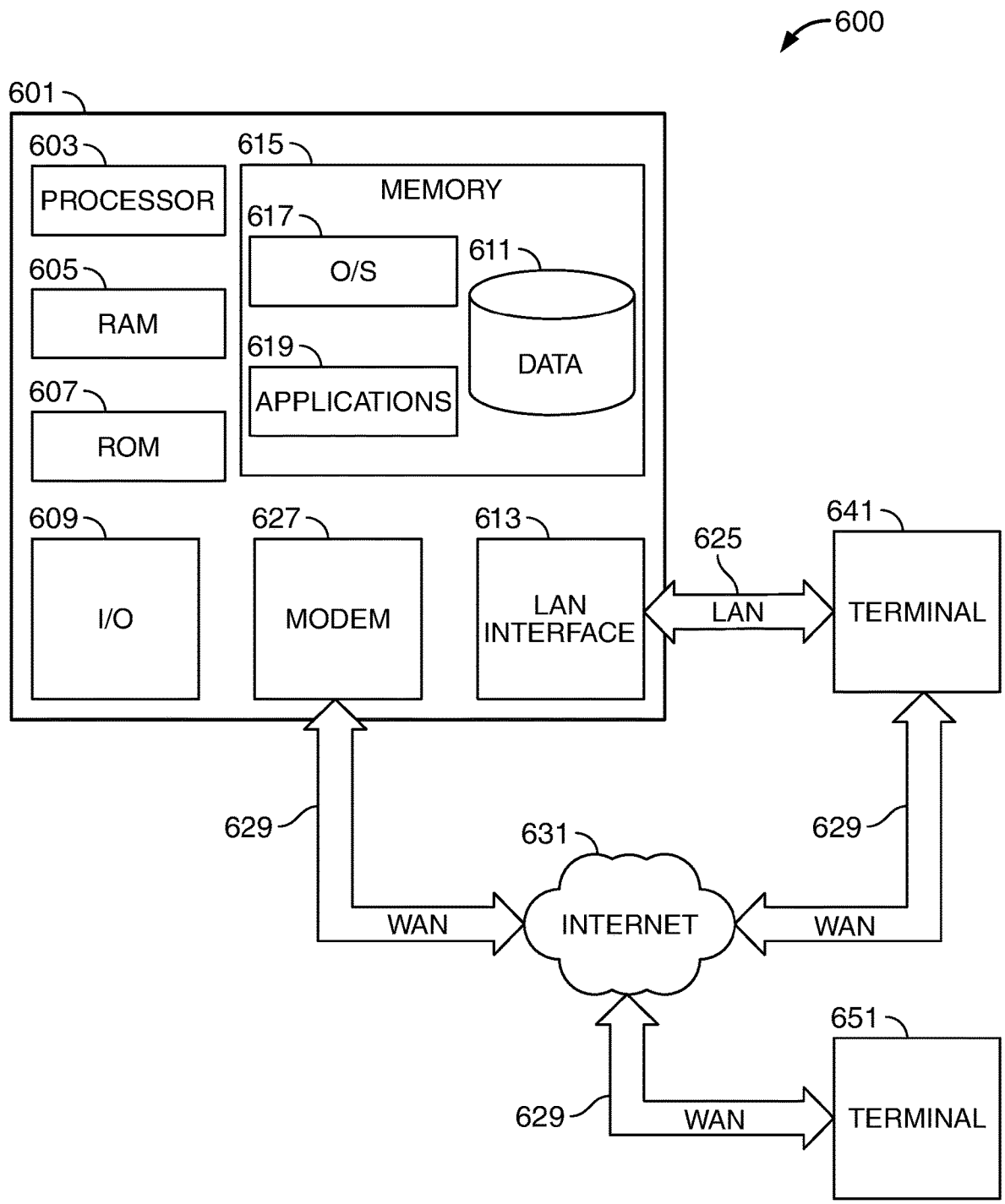
FIG. 6 shows yet another illustrative diagram in accordance with the principles of the disclosure.

FIG. 6 shows an illustrative block diagram of system 600 that includes computer 601. Computer 601 may alternatively be referred to herein as a "server" or a "computing device." Computer 601 may be a workstation, desktop, laptop, tablet, smart phone, ATM, satellite, or any other suitable computing device. Elements of system 600, including computer 601, may be used to implement various aspects of the systems and methods disclosed herein.

Computer 601 may have a processor 603 for controlling the operation of the device and its associated components, and may include RAM 605, ROM 607, input/output module 609, and memory 615. The processor 603 may also execute all software running on the computer—e.g., the operating system and/or voice recognition software. Other components commonly used for computers, such as EEPROM or Flash memory or any other suitable components, may also be part of the computer 601.

Memory 615 may be comprised of any suitable permanent storage technology—e.g., a hard drive. Memory 615 may store software including the operating system 617 and application(s) 619 along with any data 611 needed for the operation of the system 600. Memory 615 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 601 may execute the instructions embodied by the software to perform various functions.

Input/output ("I/O") module may include connectivity to a microphone, keyboard, touch screen, mouse, and/or stylus through which a user of computer 601 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 600 may be connected to other systems via a local area network ("LAN") interface 613. System 600 may operate in a networked environment supporting connections to one or more remote computers, such as terminals 641 and 651. Terminals 641 and 651 may be personal computers or servers that include many or all the elements described above relative to system 600.

The network connections depicted in FIG. 6 include a LAN 625 and a wide area network ("WAN") 629 but may also include other networks. When used in a LAN networking environment, computer 601 is connected to LAN 625 through a LAN interface or adapter 613. When used in a WAN networking environment, computer 601 may include a modem 627 or other means for establishing communications over WAN 629, such as Internet 631.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 619, which may be used by computer 601, may include computer executable instructions for invoking user functionality related to communication, such as e-mail, Short Message Service ("SMS"), and voice input and speech recognition applications. Application program(s) 619 (which may be alternatively referred to herein as "plugins," "applications," or "apps") may include computer executable instructions for invoking user functionality related performing various tasks. The various tasks may be related to database backup, search, and recovery.

Computer 601 and/or terminals 641 and 651 may also be devices including various other components, such as a battery, speaker, and/or antennas (not shown).

Terminal 651 and/or terminal 641 may be portable devices such as a laptop, cell phone, Blackberry™, tablet, smartphone, or any other suitable device for receiving, storing, transmitting and/or displaying relevant information. Terminals 651 and/or terminal 641 may be other devices. These devices may be identical to system 600 or different. The differences may be related to hardware components and/or software components.

Any information described above in connection with database 611, and any other suitable information, may be stored in memory 615. One or more of applications 619 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 7:
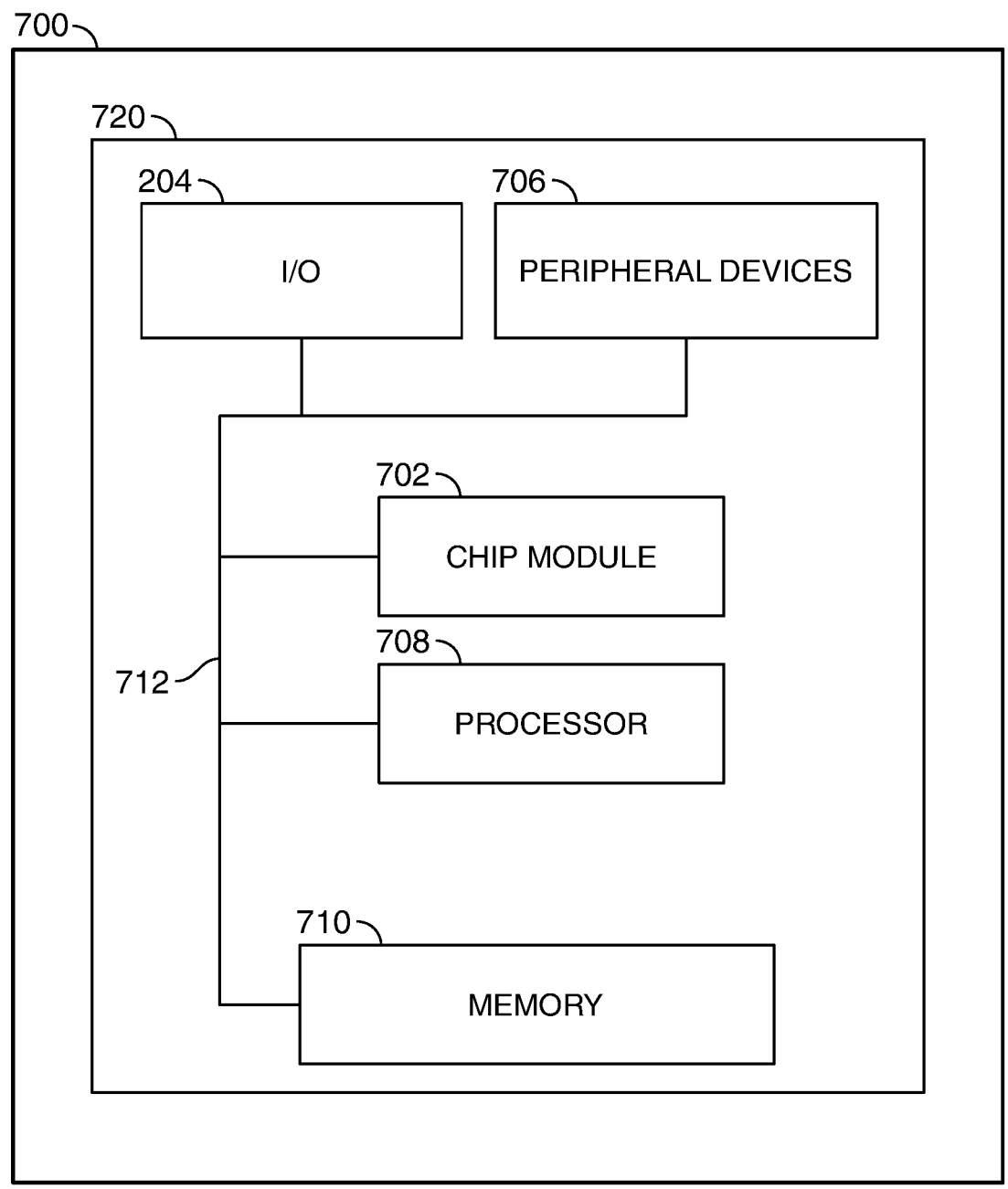
FIG. 7 shows still another illustrative diagram in accordance with the principles of the disclosure.

FIG. 7 shows illustrative system 700 that may be configured in accordance with the principles of the disclosure. System 700 may be a computing machine. System 700 may include one or more features of the system shown in FIG. 6. System 700 may include chip module 702, which may include one or more integrated circuits, and which may include logic configured to perform any other suitable logical operations.

System 700 may include one or more of the following components: I/O circuitry 704, which may include a transmitter device and a computer device and may interface with fiber optic cable, coaxial cable, telephone lines, wireless devices, PHY layer hardware, a camera/display control device or any other suitable media or devices; peripheral devices 706, which may include counter timers, real-time timers, power-on reset generators or any other suitable peripheral devices; logical processing device 708, which may compute data structural information and structural parameters of the data; and machine-readable memory 710.

Machine-readable memory 710 may be configured to store in machine-readable data structures: machine executable instructions (which may be alternatively referred to herein as "computer instructions" or "computer code"), applications, signals, and/or any other suitable information or data structures.

Components 702, 704, 706, 708 and 710 may be coupled together by a system bus or other interconnections 712 and may be present on one or more circuit boards such as 720. In some embodiments, the components may be integrated into a single chip. The chip may be silicon-based.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, a spatial computing device powered LiDAR technology enabled dynamic quick response ("QR") code generation mechanism is provided. Persons skilled in the art will appreciate that the present invention can be practiced by other than the described embodiments, which are presented for purposes of illustration rather than of limitation. The present invention is limited only by the claims that follow.

What is claimed is:

1. A method for authenticating a user with a dynamic quick response ("QR") code system, the method comprising:
    generating a map from mapping, using a light detection and ranging ("LiDAR") analyzer, an environment surrounding a spatial computing device;
    converting, using the LiDAR analyzer, the map into a video;
    storing the video in a database, said database associated with an entity;
    dividing the stored video into multiple video frames;
    arranging a pattern for placement of the multiple video frames;
    placing the multiple video frames inside a dynamic QR code, said placing in accordance with the pattern;
    scanning, using a scanning device, the dynamic QR code;
    transmitting, via an institution integration module residing on the scanning device, a first level of the dynamic QR code to the entity;
    decoding, using a first level encoder and decoder, a portion of the pattern encoded in the first level of the dynamic QR code;
    decoding, via a multi-level encoder and decoder, using the pattern as a key, a plurality of other levels within the dynamic QR code;
    retrieving the video frames from each of the plurality of other levels in accordance with the pattern;
    restoring the stored video from the retrieved video frames;
    displaying the restored video on a device associated with the entity and on the scanning device;
    comparing the restored video to a current video;
    verifying, over a predetermined threshold of confidence, the authenticity of the environment, said verifying being based upon the comparing the restored video to the current video; and
    executing a request of the user associated with the dynamic QR code.

2. The method of claim 1 further comprising verifying a legitimacy metric of each of the video frames.

3. The method of claim 1 wherein the transmitting the first level of the dynamic QR code to the entity, the decoding a portion of the pattern, the decoding the plurality of other levels, the retrieving the video frames and the restoring the stored video is executed in real-time, during the scanning the dynamic QR code.

4. The method of claim 1 wherein the spatial computing device is associated with the user.

5. The method of claim 1 wherein the spatial computing device is associated with the entity.

6. The method of claim 1 wherein the dynamic QR code and the associated video, algorithm and pattern expire after one time usage.

7. The method of claim 1 wherein the LiDAR analyzer forms a part of the spatial computing device.

8. The method of claim 1 wherein the decoding the dynamic QR code at the first level is in response to transmitting the first level of the dynamic QR code to the entity and receiving a second portion of the pattern from the entity.

9. Apparatus for a dynamic quick response ("QR") code, the apparatus comprising:
    a spatial computing device;
    a light detection and ranging ("LiDAR") analyzer, said LiDAR analyzer forming a part of the spatial computing device, wherein the spatial computing device and the LiDAR analyzer are operable to capture a video of an environment surrounding the spatial computing device;
    a database associated with an entity, said database operable to store the captured video;
    a video frame analyzer, associated with the entity, said video frame analyzer operable to divide the captured video into multiple video frames;
    an artificial intelligence ("AI") based dynamic pattern encoder, associated with the entity, said AI based dynamic pattern encoder operable to arrange a pattern for placement of the multiple video frames;
    a video frames formation generator, associated with the entity, said video frames formation generator operable to place the multiple video frames, in the dynamic QR code, in accordance with the pattern;
    generating, at the entity, the dynamic QR code, the dynamic QR code comprising:
        a first level; and
        a plurality of other levels;
    a scanning device, said scanning device operable to scan the dynamic QR code;
    an entity integration module operating on the scanning device, said entity integration module operable to transmit the first level and/or the plurality of other levels from the scanning device to the entity;
    a combination first level encoder and decoder operating at the scanning device, said combination first level encoder and decoder operable to:
        encode and decode the first level of the dynamic QR code; and
        identify an algorithm encoding the first level;
    a combination multi-level encoder and decoder, said combination multi-level encoder and decoder operable to encode and decode the plurality of other levels;
    a final QR code verifier, said final QR code verifier operable to validate the QR code; and
    a final QR code generator, the final QR code generator operable to:
        generate an identification of a user, said identification associated with the dynamic QR code; and
        verify the identification associated with the dynamic QR code.

10. The apparatus of claim 9 wherein the spatial computing device is associated with the user.

11. The apparatus of claim 9 wherein the spatial computing device is located in the environment surrounding the dynamic QR code.

12. The apparatus of claim 9 wherein a spatial device integration module is operable to transmit a captured map of the environment from the spatial computing device to the entity.

13. The apparatus of claim 9 wherein the database stores the video at a memory location associated with the user.

14. The apparatus of claim 9 wherein the final QR code verifier validates the QR code by:
retrieving the stored video from a location associated with the user; and
comparing the stored video to a current video of the user.

15. A method for providing a quick response ("QR") code, the method comprising;
generating a map, using a light detection and ranging ("LiDAR") analyzer, from mapping an environment surrounding a spatial computing device;
converting, using the LiDAR analyzer, the map into a video;
storing the video in a database;
dividing, using the LiDAR analyzer, the stored video into multiple video frames;
arranging, using an artificial intelligence ("AI") based dynamic pattern encoder, a pattern for placement of the multiple video frames;
placing, using a video frames formation mechanism, the multiple video frames into a dynamic QR code in accordance with the pattern;
scanning, using a scanning device, the dynamic QR code;
transmitting, via an entity integration module resident on the scanning device, the dynamic QR code to an entity;
decoding, using a first level encoder and decoder, an algorithm associated with a first level encoded in the dynamic QR code;
decoding, via a multi-level encoder and decoder, using the algorithm to identify the pattern, a plurality of other levels within the dynamic QR code;
retrieving the video frames from each of the plurality of other levels in accordance with the pattern;
restoring, using a video frame formation mechanism associated with the scanning device, the stored video from the retrieved video frames;
displaying the stored video on a device associated with the entity and on the scanning device;
comparing the stored video to a current video;
verifying, over a predetermined threshold of confidence, an authenticity of a user scanning the dynamic QR code, said verifying based on the comparing the restored previously stored video to the current video; and
executing a request associated with the dynamic QR code.

16. The method of claim 15 further comprising verifying, using a fraud detection controller, a legitimacy metric of each of the video frames.

17. The method of claim 15 wherein the transmitting the dynamic QR code to the entity, the decoding the algorithm, the decoding the plurality of other levels, the retrieving the video frames and the restoring the stored video is executed in real-time, during the scanning the dynamic QR code.

18. The method of claim 15 wherein the spatial computing device is associated with the entity.

19. The method of claim 15 wherein the spatial computing device is associated with the user.

20. The method of claim 15 wherein the dynamic QR code and the associated video, algorithm and pattern expire after one time usage.

21. The method of claim 15 wherein the LiDAR analyzer forms a part of the spatial computing device.

22. The method of claim 15 wherein the comparing of the restored video to the current video, uses a final QR verifier, located at the entity.

* * * * *